United States Patent [19]

Daly

[11] 4,183,545
[45] Jan. 15, 1980

[54] ROTARY VACUUM-CHUCK USING NO ROTARY UNION

[75] Inventor: John K. Daly, Scottsdale, Ariz.

[73] Assignee: Advanced Simiconductor Materials/America, Phoenix, Ariz.

[21] Appl. No.: 928,993

[22] Filed: Jul. 28, 1978

[51] Int. Cl.² .......................................... B23B 31/30
[52] U.S. Cl. ............................ 279/3; 51/235; 269/21
[58] Field of Search ................ 279/3; 269/21; 51/235

[56] References Cited

U.S. PATENT DOCUMENTS

| 2,345,884 | 4/1944 | Powers, Jr. et al. | 51/235 |
|---|---|---|---|
| 2,366,935 | 1/1945 | Schmid | 51/235 |
| 2,852,264 | 9/1958 | Granata | 279/3 |
| 2,907,258 | 10/1959 | Roth | 279/3 X |
| 2,966,010 | 12/1960 | Guignard | 51/235 X |
| 3,126,768 | 3/1964 | Gondek | 269/21 |
| 3,328,042 | 6/1967 | Mallory | 279/3 |
| 3,437,343 | 4/1969 | Greck | 279/3 |
| 3,579,916 | 5/1971 | Boettcher et al. | 51/235 X |
| 3,706,412 | 12/1972 | Latham, Jr. | 279/3 |

Primary Examiner—William R. Briggs
Attorney, Agent, or Firm—William H. Drummond

[57] ABSTRACT

A vacuum-chuck having no expensive, complex rotary unions in the vacuum lines maintains its vacuum by maintaining the surfaces which rotate with respect to each other in intimate contact with a glabrous, self-lubricating element. The vacuum is communicated to said revolving surfaces through openings in said element.

2 Claims, 4 Drawing Figures

ROTARY VACUUM-CHUCK USING NO ROTARY UNION

This invention relates to an improved rotary vacuum-chuck having means to maintain its vacuum holding capabilities while said chuck is being rotated.

In another respect, the invention relates to an improved vacuum-chuck through which the vacuum is maintained without the need of expensive, complex, rotary unions in the vacuum lines.

In still another respect, the invention relates to a rotary vacuum-chuck which may be driven from a solid drive shaft having no provision therein for the communication of vacuum between said drive shaft and said rotary chuck.

In another important respect, the invention relates to a rotary vacuum-chuck which uses its own vacuum to maintain vacuum integrity across the interface between the rotating surfaces.

In yet another respect, the invention relates to a rotary vacuum-chuck in which the vacuum is communicated between rotating surfaces through a glabrous, self-lubricating element maintained in intimate contact with the rotating surfaces.

The invention relates also to a rotary vacuum-chuck which uses a vacuum source to immobilize said chuck so as to prevent rotation while work is being performed on a workpiece affixed to the work surface of said vacuum-chuck.

Prior art discloses various expedients for maintaining the integrity of the vacuum supplied to the work surface of a rotary vacuum-chuck so as not to impair its holding capabilities while the chuck is being rotated. Maintenance of such vacuum integrity all too often involves the use of expensive, complex rotary unions in the vacuum lines. Frequently, the drive shaft used to rotate said chuck is drilled, or bored, along a line parallel to its axis to provide means for communicating the vacuum to the rotary surface of the chuck. In the latter case, it is necessary to provide a rotary union between the vacuum line and the driven end of said drive shaft.

The prior art systems suffered in that they were unduly complex, the need for rotary unions in the vacuum lines often presenting difficult packaging problems to the designer. In less complex systems, the cost of such unions and drilled drive shafts could be prohibitive. A further disadvantage displayed by the prior art was the manner in which the rotary surface was maintained immobile while work was being performed on an object held on the surface of the vacuum chuck. The mechanical devices most frequently used to immobilize the rotary work surface had further adverse effects in terms of cost of complexity of the overall system.

Therefore, it would be highly desirable to provide an improved rotary vacuum-chuck which includes a simple means to communicate the vacuum to the rotary work surface with minimal expense and complexity.

It would also be highly desirable to provide simple means for the immobilization of said rotary work surface.

Accordingly, the principal object of the invention is to provide an improved rotary vacuum-chuck system.

Another principal object of the invention is to provide an improved rotary vacuum-chuck system which eliminates the use of rotary unions on the vacuum lines and of specially drilled drive shafts.

It is a further and more specific object of the invention to provide an improved rotary vacuum-chuck which uses its own vacuum to assist in maintenance of vacuum integrity while the chuck is rotating.

It is a still further and more specific object of the invention to provide a vacuum seal between those elements of the vacuum-chuck system which rotate with respect to each other, said vacuum seal being of simple construction, easy to fabricate, and relatively inexpensive.

Still another object of the invention is the provision of simple means for immobilizing the rotary work surface which overcome the disadvantages of the prior art methods of immobilization.

These and other objects and advantages of the invention will be apparent to those skilled in the art from the following detailed description thereof, taken in conjunction with the drawings, in which.

Figure 2:
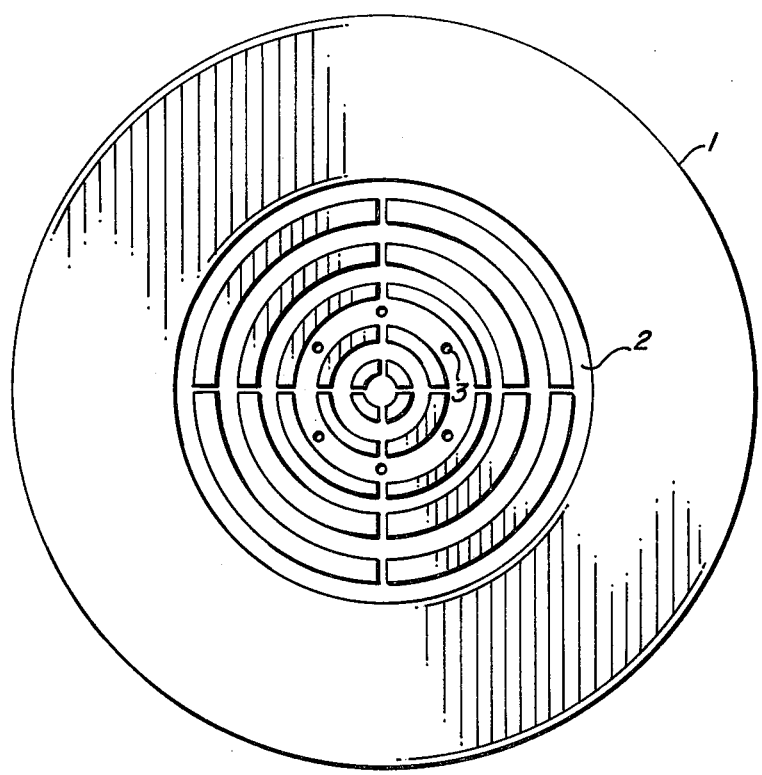
FIG. 2 is a plan view of the working surface of the rotary vacuum-chuck.
Figure 3:
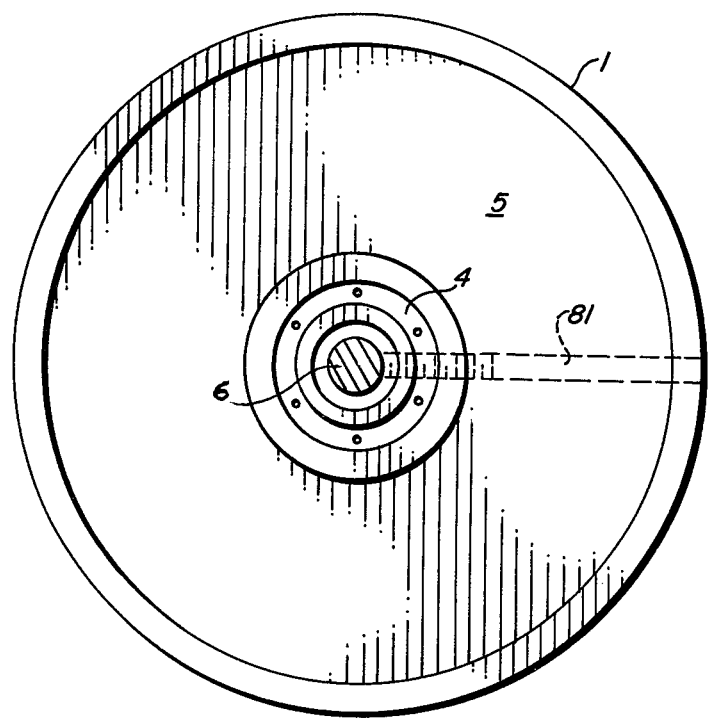
Figure 4:
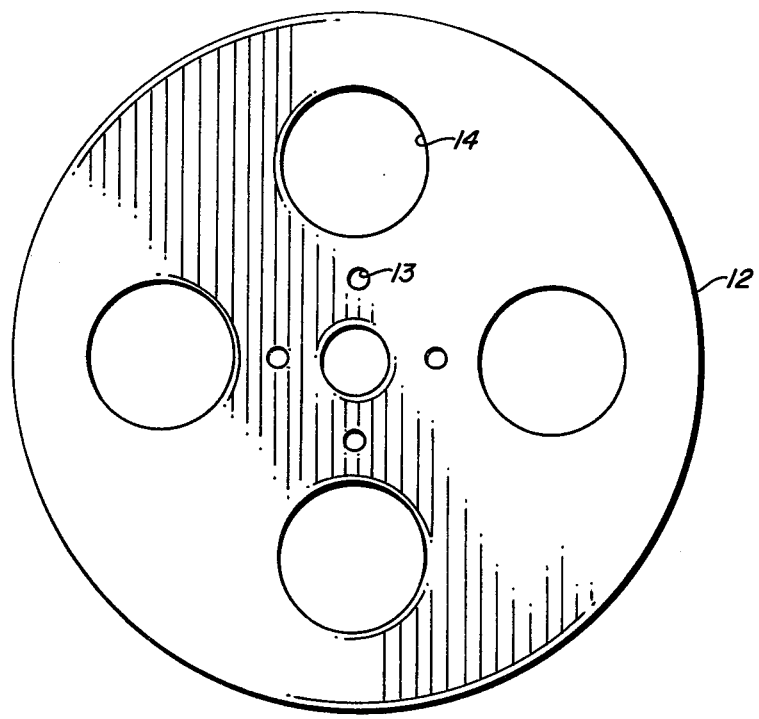

FIG. 3 is a plan view of the lower surface of the rotary vacuum-chuck illustrating the raised lands which contribute to the innovative working of the invention. The pattern of raised lands shown in FIG. 2 duplicates that on the fixed surface below the rotary vacuum-chuck. Said vacuum-chuck rotates with respect to said fixed surface; and FIG. 4 illustrates an embodiment of the glabrous, self-lubricating, impermeable element which is maintained in contact with those elements of the vacuum-chuck system which rotate with respect to each other.

Briefly, in accordance with the invention, I provide an improved seal for maintaining the vacuum while the vacuum-chuck is being rotated. The work surface of the vacuum-chuck is conventional and includes raised lands to support the workpiece and means to communicate the vacuum to the channels defined by, and surrounding, said raised lands such that a workpiece is caused to adhere to the work surface of said vacuum-chuck by reason of the external air pressure bearing on said workpiece. Motive means are provided to the rotary work surface via a motor-driven drive shaft. The improvement comprises the operative combination of complementary raised lands on the opposing surfaces of the rotary chuck system which rotate with respect to each other, said lands being maintained in sealing contact with the glabrous, self-lubricating surface of an impermeable vacuum sealing element. Independent channels are provided in said impermeable sealing element for selectively communicating a vacuum to the work surface channels of the rotary chuck and to a separate vacuum channel below the rotary element of the vacuum chuck so as to hold said rotary element immobile. In addition to the vacuum channel for holding the rotary element immobile, an important element of the invention comprises an additional vacuum channel located beneath the rotary element of the chuck and emplaced in close proximity to and about the drive shaft used to couple the motive force to the rotary element. When this additional vacuum channel is evacuated, the complementary raised lands, noted above, are brought into sealing contact with said impermeable seal, the glabrous, self-lubricating surface of said seal permitting the complementary raised lands to rotate slidingly with respect to each other without adversely effecting the integrity of the vacuum of said evacuated additional vacuum channel. When the source of the vacuum for adhering a workpiece to the rotary work surface is drawn from said additional evacuated vacuum channel, rotation of the chuck is possible without impairing the adhesion of the workpiece to the work surface.

According to one presently preferred embodiment of the invention, the improved rotary vacuum-chuck includes a rotary element having conventional vacuum channels inscribed in its work surface and orifices for communicating the vacuum between said conventional vacuum channels and the lower surface of said rotary element. On said lower surface, said orifices open onto a vacuum channel defined by at least two raised lands. These raised lands define a circular vacuum channel which is concentric with the center of rotation of the rotary element of said vacuum-chuck system. The radii defining the edges of said raised lands are held to relatively small values compared to the overall radius of the rotating element of the vacuum-chuck system for purposes which are fully disclosed herein. A third raised land, defined by radii relatively greater than those which define the two raised lands just mentioned, establishes the outer boundary of a second and larger vacuum channel on the lower surface of said rotary element. A fixed element is provided having a surface adapted to support said rotary element. This fixed surface bears a pattern of raised lands and vacuum channels complementary to that on the lower surface of the rotary element. A glabrous, self-lubricating, vacuum-sealing element is emplaced between said rotary element and said fixed element such that sealing contact is maintained between said sealing element and the surfaces of the raised lands on the respective fixed and rotary elements. Openings defined in said sealing element permit the communication of vacuum between one vacuum channel defined on the surface of said fixed element and its complementary vacuum channel defined on the lower surface of said rotary element. Means are provided to independently connect each of the two vacuum channels so defined to a vacuum source. Motive means are also provided to drive said rotary element about its axis of rotation.

Figure 1:
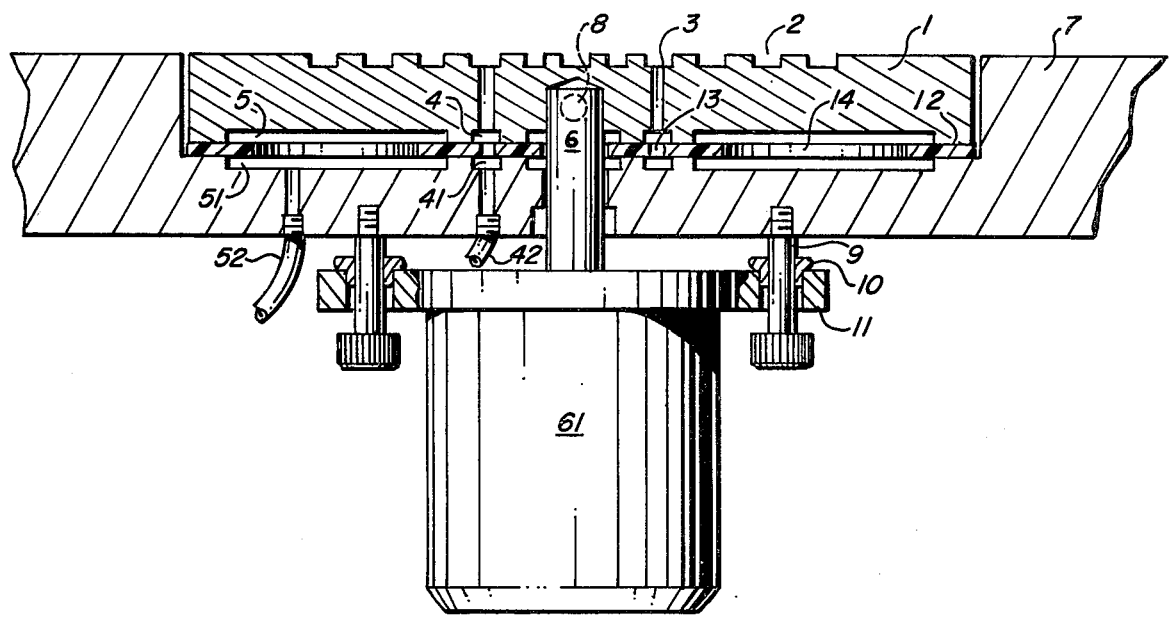
FIG. 1 is a partial cross-section of the rotary chuck system showing the innovative concepts which maintain vacuum integrity during rotation of the chuck and which maintain the rotary work surface immobile while work is being performed thereon.

Turning now to the drawings, in which a presently preferred embodiment of the invention is shown for purposes of illustration, FIG. 1 depicts the necessary elements defining a rotary vacuum-chuck which utilizes its own vacuum to maintain vacuum integrity while the chuck is rotated and also uses simple vacuum means to maintain the rotary element of said vacuum-chuck immobile while work is being performed on the workpiece on the working surface of the chuck. Rotary element 1 may display a conventional work surface such as illustrated in FIG. 2. Conventionally, the work surface consists of a group of interconnected vacuum channels 2 and one or more orifices 3 for communicating a vacuum to said vacuum channel. The lower surface of rotary element 1 is maintained in sliding contact with sealing element 12, the combination of rotary element 1 and sealing element 12 being supported by fixed element 7. When so supported, the entire combination defines two interior vacuum channels. A small annular vacuum channel is defined by channels 4 and 41 in combination. A second and relatively larger vacuum channel is defined by channels 5 and 51 acting in cooperative combination. Sealing element 12 is a glabrous, self-lubricating, impermeable sealing element, such as, for example, Teflon. Openings 13 in sealing element 12 communicate the vacuum from channel 41 to channel 4 from whence it is in turn communicated to surface vacuum channels 2 via orifices 3. Openings 14 in sealing element 12 communicate the vacuum from channel 51 to channel 5. Vacuum line 42 is connected to a vacuum source through a vacuum control means, neither of which is shown, and supplies the vacuum to vacuum channel 4/41 and surface channels 2. Vacuum line 52, similarly connected to a vacuum source through independent vacuum control means, again neither of which are shown, communicates the vacuum to vacuum channel 5/51.

In the embodiment shown, drive shaft 6 of drive motor 61 is connected directly to rotary element 1 at its center of rotation. Drive shaft 6 may be pinned or screw fastened to rotary element 1, as indicated by 8 in FIG. 1. Bore 81, shown in FIG. 3, is provided to permit access of such a pin or screw fastener to drive shaft 6. The vacuum integrity of vacuum channel 4/41 is preserved by having bore 81 pass clear of said channel. In the embodiment shown in FIG. 1, drive motor 61 is supported by rotary element 1 by means of fastener 8 on drive shaft 6. The weight of motor 61 increases the bearing forces applied to the opposing surfaces of vacuum sealing element 12 by the complimentary raised lands on rotary element 1 and fixed element 7. The bearing force so induced by the weight of motor 61 is sufficient to preserve a reasonable seal at the contacting surfaces of elements 1 and 7 and sealing element 12. When a vacuum is applied to lines 42 or 52, or to both of them, the sealing contact on sealing element 12 is further increased, thus improving vacuum integrity of the system. Since the weight of motor 61 is supported by rotary element 1, shoulder screws 9 are supplied solely for the purpose of resisting torsional forces on the motor case when the motor is energized. None of the weight of drive motor 61 is transmitted to shoulder screws 9 and resilient grommets 10 are provided to accept torsional forces experienced between shoulder screws 9 and motor flange 11.

In practicing the invention, a workpiece is laid atop the work surface of rotary element 1, and vacuum line 42, which may have been vented to the atmosphere, is connected by vacuum control means to a vacuum source. The air in channels 2 beneath the workpiece is drawn off through orifices 3 through vacuum channel 4/41 with the following result: As the air is drawn from channels 2 on the work surface, external air pressure causes the workpiece to adhere tenaciously to that work surface. As the air is drawn from vacuum channel 4/41, the sealing forces applied to the surface of sealing element 12 by the raised lands defining vacuum channel 4/41 are increased, improving the vacuum seal in that region. Because vacuum channel 4/41 is placed in close proximity to, and concentric with, drive shaft 6, very little effort is required to rotate rotary element 1, since the smooth, self-lubricating surface of vacuum sealing element 12, which may be, for example, Teflon, permits a low friction, slidable, sealing contact. Energizing drive motor 61 at this time permits rotary element 1 to be rotated without impairing the vacuum integrity at the interface of the rotating surfaces and the tenacity with which the workpiece adheres to the work surface is preserved. To immobilize rotary element 1 after it has been rotated into a position at which work is to be performed, vacuum line 52, which may have been vented to the atmosphere, is connected through vacuum control means to a vacuum source. As the air is drawn from vacuum channel 5/51, the effect of air pressure bearing on the work surface of rotary element 1 is greatly increased since vacuum channel 5/51 comprises a major portion of the undersurface of rotary element 1. As the vacuum in vacuum channel 5/51 is substantially increased, it becomes progressively more difficult to obtain rotation of rotary element 1 and that element becomes effectively immobilized so that work may be performed on the workpiece adhering to its work surface without inadvertent rotation being introduced.

What I have disclosed herein is a rotary vacuum-chuck system utilizing a smooth, self-lubricating sealing element in combination with a relatively small evacuated area, the very evacuation of which tends to increase the sealing integrity of the vacuum seal in that area while permitting rotation of the rotary work surface about a point concentric with said relatively small evacuated area; said vacuum seal being further utilized in combination with a significantly larger evacuated space beneath said rotary work surface such that when said relatively larger space is evacuated, the effect of atmospheric pressure acting upon the surface of said rotary element is to hold said element immobilized.

It is understood that those skilled in the art may envision modifications of the embodiment disclosed herein without departing from the basic teachings of this invention. For example, the initial sealing forces provided by the weight of the drive motor could readily be supplied by spring tensioning means. Other such non-innovative modifications may be conceived without diluting the effectiveness of the teachings herein.

Having described my invention in such a clear and concise manner as to enable those skilled in the art to understand and practice it, and having described a presently preferred embodiment thereof, I claim:

1. In a rotary vacuum-chuck system having a rotary element with a work surface to which a workpiece is adhered by vacuum means and a fixed element providing support for said rotary element, an improvement for maintaining the vacuum to said work surface while said rotary element is in motion, said improvement comprising:
   (a) a substantially flat vacuum sealing element emplaced between said rotary element and said fixed element and having a smooth, self-lubricating surface providing low friction, slidable contact support for said rotary element;
   (b) on the side of said rotary element in contact with said sealing element, two radially spaced annular raised bearing surfaces defining a vacuum channel in close proximity to and concentric with the center of rotation of said rotary element, said vacuum channel being sized such that evacuation thereof improves the sealing contact of said raised bearing surfaces with said sealing element while permitting said rotary element to be rotated easily about its center of rotation, said sealing element having openings communicating with said vacuum channel;
   (c) means for exhausting the air from said vacuum channel through said openings; and
   (d) means for communicating the vacuum produced in said vacuum channel to said work surface such that a workpiece will adhere to said work surface.

2. The improved rotary vacuum-chuck system of claim 1, having a second vacuum channel sized such that evacuation thereof effectively immobilizes said rotary element and means for exhausting the air from said second vacuum channel.

* * * * *